(12) United States Patent
Hashimoto

(10) Patent No.: US 8,437,898 B2
(45) Date of Patent: May 7, 2013

(54) VEHICLE CONTROL APPARATUS AND VEHICLE CONTROL METHOD

(75) Inventor: Keita Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 211 days.

(21) Appl. No.: 13/150,706

(22) Filed: Jun. 1, 2011

(65) Prior Publication Data

US 2011/0307132 A1 Dec. 15, 2011

(30) Foreign Application Priority Data

Jun. 11, 2010 (JP) ................................. 2010-134231

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................... 701/22; 701/36; 701/102

(58) Field of Classification Search .................. 701/22, 701/36, 102
See application file for complete search history.

(56) References Cited

U.S. PATENT DOCUMENTS

| | | | | |
|---|---|---|---|---|
| 5,321,231 | A | * | 6/1994 | Schmalzriedt et al. ........ 219/497 |
| 7,007,460 | B2 | * | 3/2006 | Frieden et al. .................. 60/284 |
| 2003/0036841 | A1 | * | 2/2003 | Xu et al. ......................... 701/102 |
| 2010/0250090 | A1 | * | 9/2010 | Jasinkiewicz et al. ........ 701/102 |
| 2010/0268438 | A1 | * | 10/2010 | Hiranuma et al. ............. 701/102 |

FOREIGN PATENT DOCUMENTS

| | | |
|---|---|---|
| JP | A-2004-245135 | 9/2004 |
| JP | A-2005-2989 | 1/2005 |
| JP | A-2006-149023 | 6/2006 |
| JP | A-2006-224772 | 8/2006 |
| JP | A-2008-312400 | 12/2008 |
| JP | A-2009-165326 | 7/2009 |
| JP | A-2010-63222 | 3/2010 |

OTHER PUBLICATIONS

Jan. 10, 2012 Office Action issued in Japanese Patent Application No. 2010-134231 (with partial translation).

* cited by examiner

*Primary Examiner* — Mary Cheung
*Assistant Examiner* — Frederick Brushaber
(74) *Attorney, Agent, or Firm* — Oliff & Berridge, PLC

(57) ABSTRACT

In a vehicle control for a vehicle that includes: an internal combustion engine; a vehicle-driving rotary electric machine that generates drive force on a drive wheel; and an electricity storage device that supplies electric power to the vehicle-driving rotary electric machine, the internal combustion engine includes an exhaust passageway, a catalyst provided in the exhaust passageway, and a heater device that heats the catalyst by using electric power from the electricity storage device. The vehicle control includes determining whether an execution condition that a state of the drive wheel is changing between a slipping state and a gripped state is satisfied; and executing a control for causing the electric power generated by the vehicle-driving rotary electric machine to be consumed by the heater device if the execution condition is satisfied.

10 Claims, 6 Drawing Sheets

VEHICLE CONTROL APPARATUS AND VEHICLE CONTROL METHOD

INCORPORATION BY REFERENCE

The disclosure of Japanese. Patent Application No. 2010-134231 filed on Jun. 11, 2010 including the specification, drawings and abstract is incorporated herein by reference in its entirety.

BACKGROUND OF THE INVENTION

1. Field of the Invention

The invention relates to a control of a vehicle equipped with an internal combustion engine and a vehicle-driving rotary electric machine. Specifically, the invention relates to a technology of consuming electric power generated by the vehicle-driving rotary electric machine, by using a heater device provided for heating a catalyst of the internal combustion engine, when the state of drive wheels of the vehicle changes between a slipping state and a gripped state.

2. Description of Related Art

In recent years, hybrid vehicles, fuel-cell vehicles, electric motor vehicles, etc. are drawing attention as a measure to curb environmental problems. With regard to such vehicles, there is a known technology of storing surplus electric energy that is generated when regenerative braking is performed via an electric motor, by an electricity storage device, or technology of absorbing surplus electric energy that is generated when regenerative braking is performed via an electric motor, by operating an accessory.

For example, Japanese Patent Application Publication No. 2005-002989 (JP-A-2005-002989) describes a motive power output apparatus that deals with a request for a braking force, which is made by turning off an accelerator pedal while taking into account a charging limit regarding the electricity storage device. The motive power output apparatus outputs motive power to a drive shaft, and includes: an internal combustion engine; electric power/motive power input/output means that outputs at least a portion of the motive power from the internal combustion engine via input and output of electric power and motive power; an electric motor capable of inputting/outputting the motive power to the drive shaft; electricity storage means capable of giving electric power to and receiving electric power from the electric power/motive power input/output means and the electric motor; an accessory that operates while consuming electric power that is produced from at least one of the electricity storage means, the electric power/motive power input/output means and the electric motor; control means for controlling the internal combustion engine, the electric power/motive power input/output means and the electric motor so that a requested drive force is output to the drive shaft; and accessory control means for forcing the accessory to operate regardless of the presence or absence of an operation command if it is predicted that the electricity storage means is to be charged with an electric power that exceeds a charge restriction of the electricity storage means by a control performed by the control means when a braking force on the drive shaft is requested by an action of reducing the amount of operation of an accelerator.

The motive power output apparatus described in the foregoing publication is able to output to the drive shaft a braking force that is requested via the action of reducing the amount of accelerator operation while taking into account the charge restriction of the electricity storage means. As a result, it is possible to restrain the deterioration of drivability in relation to the braking force requested via the action of the accelerator operation-reducing action while taking into account the charge restriction of the electricity storage means.

However, in the case where the drive wheels are changed between a slipping state and a gripped state, surplus electric power is suddenly and rapidly produced from the vehicle-driving rotary electric machine, giving rise to a problem in that the generated surplus electric power cannot be sufficiently consumed in good response. If the surplus electric power cannot be sufficiently consumed, it may hinder the battery from delivering its full performance.

The motive power output apparatus described in the foregoing publication operates an air-conditioner compressor in order to consume the surplus electric power that is produced during regenerative braking. An air-conditioner compressor is able to consume electric power as the rotation speed of an electric motor provided in the air-conditioner compressor increases after supply of electric power to the electric motor is started. Therefore, since the electric power that can be consumed is limited when the rotation speed of the motor is low, the air-conditioner compressor is not able to highly responsively and sufficiently consume the surplus electric power that suddenly occurs.

In addition, although it is conceivable to provide a discharge resistor that is mainly intended to consume surplus electric power, this will increase the number of component parts, and may become a factor of cost increase.

SUMMARY OF THE INVENTION

The invention provides a vehicle control apparatus and a vehicle control method for a vehicle that are capable of efficiently consume the surplus electric power that a vehicle-driving rotary electric machine of a vehicle sharply generates when the state of drive wheels of the vehicle changes between a slipping state and a gripped state.

A first aspect of the invention relates to a vehicle control apparatus mounted in a vehicle that includes: an internal combustion engine; a vehicle-driving rotary electric machine that generates drive force on a drive wheel; and an electricity storage device that supplies electric power to the vehicle-driving rotary electric machine. In this vehicle control apparatus, the internal combustion engine includes an exhaust passageway, a catalyst provided in the exhaust passageway, and a heater device that heats the catalyst by using electric power from the electricity storage device. The vehicle control apparatus includes a determination portion that determines whether an execution condition that a state of the drive wheel is changing between a slipping state and a gripped state is satisfied, and a control portion that executes a control for causing the electric power generated by the vehicle-driving rotary electric machine to be consumed by the heater device if the execution condition is satisfied. In the vehicle control apparatus, the execution condition may be a condition that the state of the drive wheel is changing from the slipping state to the gripped state. The vehicle control apparatus may further include a rotational speed detection portion that detects rotational speed of the drive wheel, and the determination portion may determine whether the execution condition is satisfied, based on the rotational speed of the drive wheel.

In the vehicle control apparatus, the vehicle may further include a switching portion that switches from one to another of an electric power supply state in which the electric power is supplied from an electric power supply source to the heater device and an electric power cut-off state in which the electric power supplied from the electric power supply source to the heater device is cut off, and the vehicle control apparatus may further include an estimation portion that estimates generated electric power that is generated by the vehicle-driving rotary electric machine. In this construction, if the generated electric power estimated by the estimation portion is greater than a threshold value and if the execution condition is satisfied, the control portion may switch state of the switching portion from the electric power cut-off state to the electric power supply state so that the electric power generated by the vehicle-driving rotary electric machine is consumed by the heater device.

In the vehicle control apparatus, if the execution condition is satisfied and the generated electric power estimated by the estimation portion is lower than or equal to the threshold value, the control portion may charge the electricity storage device by using the electric power generated by the vehicle-driving rotary electric machine.

In the vehicle control apparatus, the vehicle may further include a switching portion that switches from one to another of an electric power supply state in which the electric power is supplied from an electric power supply source to the heater device and an electric power cut-off state in which the electric power supplied from the electric power supply source to the heater device is cut off, and the vehicle control apparatus may further include a temperature detection portion that detects temperature of the catalyst. In this construction, if the temperature of the catalyst detected by the temperature detection portion is lower than or equal to a predetermined temperature and if the execution condition is satisfied, the control portion may switch state of the switching portion from the electric power cut-off state to the electric power supply state so that the electric power generated by the vehicle-driving rotary electric machine operating as the electric power supply source is consumed by the heater device.

In the vehicle control apparatus, if the execution condition is satisfied and the temperature of the catalyst detected by the temperature detection portion is higher than the predetermined temperature, the control portion may charge the electricity storage device by using the electric power generated by the vehicle-driving rotary electric machine.

A second aspect of the invention concerns a vehicle control method for a vehicle that includes: an internal combustion engine; a vehicle-driving rotary electric machine that generates drive force on a drive wheel; and an electricity storage device that supplies electric power to the vehicle-driving rotary electric machine. In this vehicle control method, the internal combustion engine includes an exhaust passageway, a catalyst provided in the exhaust passageway, and a heater device that heats the catalyst by using electric power from the electricity storage device, and the vehicle control method includes: determining whether an execution condition that a state of the drive wheel is changing between a slipping state and a gripped state is satisfied; and executing a control for causing the electric power generated by the vehicle-driving rotary electric machine to be consumed by the heater device if the execution condition is satisfied. In the vehicle control method, the execution condition may be a condition that the state of the drive wheel is changing from the slipping state to the gripped state. The vehicle control method may further include detecting rotational speed of the drive wheel, and whether the execution condition is satisfied may be determined based on the rotational speed of the drive wheel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
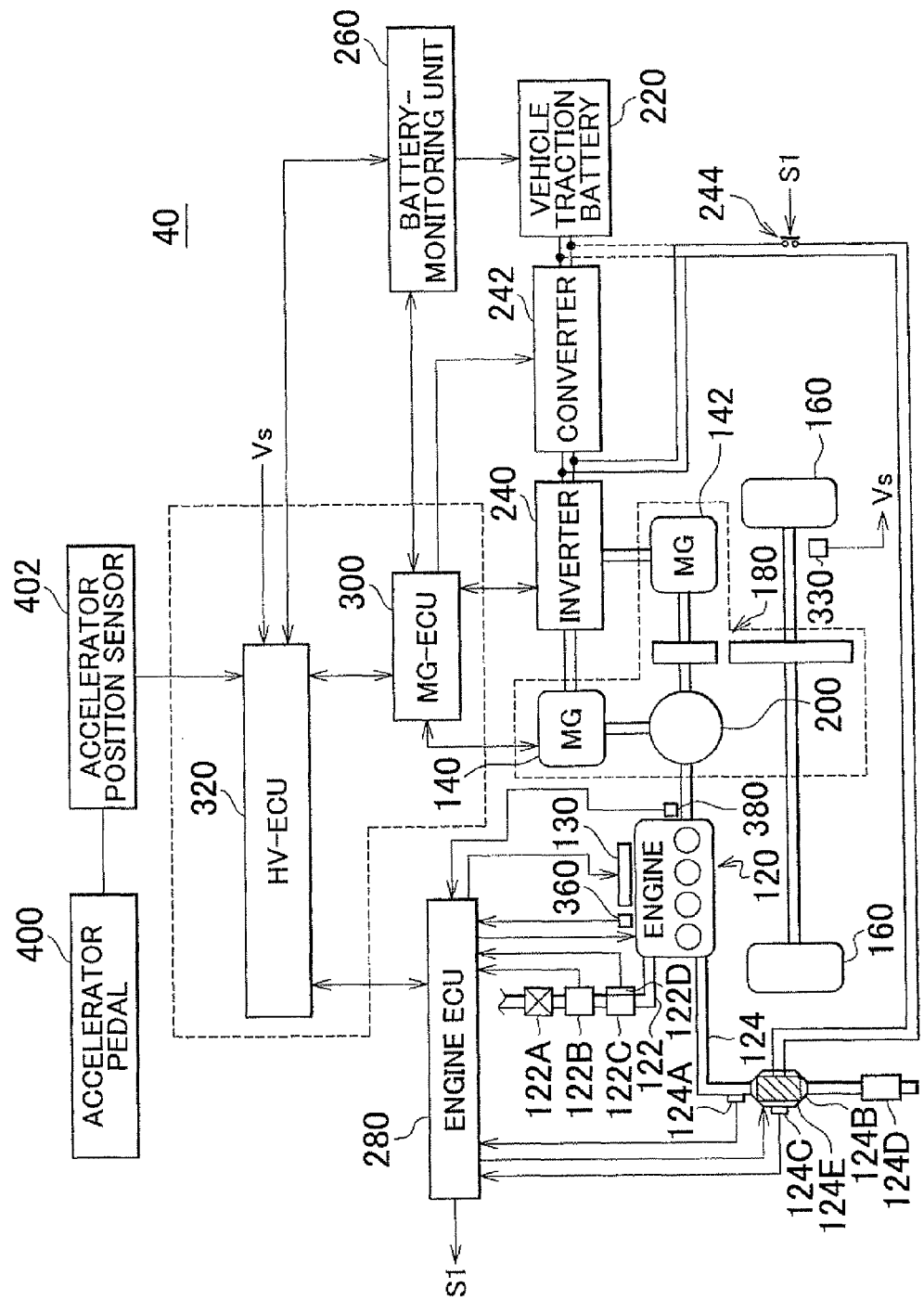
FIG. 1 is a diagram showing an overall construction of a hybrid vehicle according to an embodiment of the invention.

Embodiments of the invention will be described hereinafter with reference to the drawings. In the description below, like component parts are denoted by like reference characters. Those like component parts are given the same names, and perform the same functions. Therefore, those component parts will not be redundantly described in detail.

With reference to FIG. 1, a vehicle 40 equipped with a vehicle control apparatus in accordance with an embodiment of the invention will be described.

The vehicle 40 includes an engine 120, a first motor-generator 140 (hereinafter, termed the first MG 140), a second motor-generator 142 (hereinafter, termed the second MG 142), drive wheels 160, a reduction gear 180, a power splitting mechanism 200, a vehicle traction battery 220, an inverter 240, a converter 242, a battery monitoring unit 260, an engine Electronic Control Unit (ECU) 280, an MG-ECU 300, an HV-ECU 320, an accelerator pedal 400, and an accelerator pedal position sensor 402. The vehicle control apparatus in accordance with this embodiment is realized by the The engine 120 may be an internal combustion engine such as a gasoline engine, a diesel engine, etc. The engine 120 includes an intake passageway 122, an exhaust passageway 124, a fuel injection device 130, a coolant temperature sensor 360, and an engine rotation speed sensor 380.

The intake passageway 122 is provided with an air cleaner 122A for trapping dust in intake air, an air flow meter 122B for detecting the amount of air that is taken into the engine 120 through the air cleaner 122A, and an electronic throttle valve 122C that is a valve for adjusting the amount of air that is taken into the engine 120. The electronic throttle valve 122C is provided with a throttle position sensor 122D.

The exhaust passageway 124 is provided with a three-way catalytic converter 124B, an air/fuel ratio sensor 124A for detecting the air/fuel ratio (A/F) in exhaust gas that is introduced into the three-way catalytic converter 124B, a catalyst temperature sensor 124C for detecting the temperature of the three-way catalytic converter 124B, a silencer 124D, an Electrical Heating Catalyzer (EHC) 124E that is a heater device for heating the three-way catalytic converter 124B.

The EHC 124E is an electrical heater that heats the three-way catalytic converter 124B when a relay 244 is turned on according to a control signal S1 from the engine ECU 280.

The EHC 124E becomes activated when supplied with electric power from the converter 242.

The relay 244 is provided between the converter 242 and the EHC 124E, and switches from one to another of an electric power supply state in which electric power is supplied from the converter 242 to the EHC 124E and an electric power cut-off state in which the electric power supplied from the converter 242 to the EHC 124E is cut off, in accordance with the control signal S I from the engine ECU 280.

The EHC 124E, as the relay 244 is turned on, is activated by the electric power supplied from the converter 242 so as to heat the three-way catalytic converter 124B.

Incidentally, the electric power supply source for the EHC 124E is not limited to the converter 242. For example, the EHC 124E may be connected to the vehicle traction battery 220 via the relay 244 so that the EHC 124E is supplied with electric power from the vehicle traction battery 220, as shown by interrupted lines in FIG. 1.

The first MG 140 has a function as a generator that generates electricity by using the engine 120, and also a function as an electric motor that starts the engine 120.

The second MG 142 has a function as an electric motor that drives the vehicle 40, and also a function as a generator that generates electricity by regenerative braking.

The engine 120, the first MG 140 and the second MG 142 are interconnected via the power splitting mechanism 200. The power splitting mechanism 200 is, for example, a planetary gear set, and distributes motive power generated by the engine 120 between a path to the drive wheels 160 and a path to the first MG 140. The power splitting mechanism 200 functions as a continuously variable transmission through control of the rotation speed of the first MG 140.

The reduction gear 180 is provided between the power splitting mechanism 200 and the second MG 142. The reduction gear 180 transmits to the drive wheels 160 the motive power (drive force) transmitted from the engine 120 via the power splitting mechanism 200, or the motive power generated by the second MG 142. That is, the engine 120 and the second MG 142 drive a drive wheels 160. The reduction gear 180 transmits reaction force transmitted from the road surface via the drive wheels 160, to the engine 120 or the second MG 142, via the power splitting mechanism 200.

The inverter 240 performs conversion between direct-current electric power and alternating-current electric power according to a control signal from the MG-ECU 300. For example, the inverter 240 converts the direct-current electric power supplied from the vehicle traction battery 220 via the converter 242 into alternating-current electric power, and supplies it to the first MG 140 or the second MG 142, or converts the alternating-current electric power generated by the first MG 140 or the second MG 142 into direct-current electric power, and sends out the converted power to charge the vehicle traction battery 220, via the converter 242. The MG-ECU 300 controls the first MG 140, the second MG 142 and the inverter 240 in accordance with the state of the vehicle 40.

The battery monitoring unit 260 monitors the state of charge/discharge of the vehicle traction battery 220. Concretely, the battery monitoring unit 260 monitors the voltage, current and temperature of the vehicle traction battery 220 using sensors (not shown), and sends these information to the MG-ECU 300 or the HV-ECU 320.

The converter 242 is provided between the vehicle traction battery 220 and the inverter 240. The converter 242 increases the voltage from the vehicle traction battery 220 to a target voltage that is determined by the HV-ECU 320 in accordance with the state of the vehicle, and supplies the increased voltage to the inverter 240. The converter 242 includes a smoothing capacitor. When the voltage-increasing operation is performed, charge is stored into the smoothing capacitor.

The vehicle traction battery 220 is an electricity storage device that stores electric power for driving the first MG 140 or the second MG 142. For example, the vehicle traction battery 220 is a secondary battery, a capacitor, etc.

The engine ECU 280 is connected to the air flow meter 122B, the throttle position sensor 122D, the air/fuel ratio sensor 124A, the catalyst temperature sensor 124C, the coolant temperature sensor 360 and the engine rotation speed sensor 380. The engine ECU 280 controls the operation state of the engine 120 on the basis information from these sensors.

The air flow meter 122B detects the amount of intake air that flows into the intake passageway 122. The air flow meter 122B sends a signal that shows the detected intake air amount, to the engine ECU 280.

The throttle position sensor 122D detects the degree of opening of the electronic throttle valve 122C (hereinafter, termed the throttle opening degree). The throttle position sensor 122D sends a signal that shows the detected throttle opening degree, to the engine ECU 280.

The engine rotation speed sensor 380 detects the rotation speed of the engine 120. The engine rotation speed sensor 380 sends to the engine ECU 280 a signal that shows the detected rotation speed of the engine 120.

The engine ECU 280 heats the three-way catalytic converter 124B through the use of the EHC 124E by sending the control signal Si to the relay 244 and therefore turning on the relay 244, for example, when the catalyst temperature received from the catalyst temperature sensor 124C after the engine 120 is started is lower than or equal to a predetermined temperature, that is, when the three-way catalytic converter 124B is cold. When the catalyst temperature is higher than a predetermined temperature after being raised by heating, that is, when the three-way catalytic converter 124B has been warmed up, the engine ECU 280 stops the heating by turning off the relay 244.

The HV-ECU 320 is connected to a wheel speed sensor 330, the accelerator pedal position sensor 402 and the battery monitoring unit 260, and controls the entire hybrid system so that the vehicle 40 runs the most efficiently, by managing and controlling the engine ECU 280 and the MG-ECU 300 in relation to each other on the basis of information input from the various sensors and information regarding the state of charge/discharge of the vehicle traction battery 220 acquired from the battery monitoring unit 260.

The wheel speed sensor 330 detects the rotation speed of the drive wheels 160. The wheel speed sensor 330 sends a signal that shows the rotation speed of the detected drive wheels 160, to the HV-ECU 320.

The accelerator pedal position sensor 402 detects the amount of depression of the accelerator pedal 400. The accelerator pedal position sensor 402 sends a signal that shows the detected amount of depression of the accelerator pedal 400, to the HV-ECU 320.

Incidentally, although in FIG. 1 the engine ECU 280, the HV-ECU 320 and the MG-ECU 300 are separately constructed, two or more of the ECUs may be integrated into a single ECU. In an example of the integration, the MG-ECU 300 and the HV-ECU 320 are integrated into an ECU as shown by a dotted line in FIG. 1.

The HV-ECU 320 controls the power output by or the amount of electricity generated by the first MG 140 and the second MG 142, or instructs the engine ECU 280 to control the output power of the engine 120, according to the requested drive force that corresponds to the amount of depression of the accelerator pedal 400.

In the vehicle 40 equipped with a hybrid system as shown in FIG. 1, the HV-ECU 320 controls the second MG 142 while holding the engine 120 in a stopped state so that the vehicle 40 travels by using the motive power of the second MG 142, when the efficiency of the engine 120 is low, during launching, low-speed traveling, etc.

During the ordinary traveling of the vehicle 40, the HV-ECU 320, for example, divides the power transmission path from the engine 120 into two paths, that is, a path of direct transmission to the drive wheels 160 and a path of transmission to the first MG 140 for electricity generation, through the use of the power splitting mechanism 200, by controlling the first MG 140.

At this time, the HV-ECU 320 performs the driving assist for the drive wheels 160 by driving the second MG 142 through the use of electric power that is generated by the first MG 140.

Besides, during the high-speed traveling, the HV-ECU 320 increases the output of the second MG 142 by supplying the second MG 142 with electric power from the vehicle traction battery 220. The increased output is added to the drive wheels 160 as the driving force on the drive wheels 160.

On the other hand, when the vehicle decelerates, the HV-ECU 320 performs regenerative electricity generation by causing the second MG 142 that is driven by the drive wheels 160 to function as a generator, and stores the recovered electric power into the vehicle traction battery 220.

Incidentally, when the amount of electricity stored in the vehicle traction battery 220 is low and therefore the charging thereof is particularly needed, the HV-ECU 320 increases the output of the engine 120 and therefore increases the amount of electricity generated by the first MG 140, so as to increase the amount of electricity stored in the vehicle traction battery 220.

Besides, there are cases in which even during the low-speed traveling, the HV-ECU 320 performs a control of increasing the drive force of the engine 120 according to need. Examples of such cases include a case where the charging of the vehicle traction battery 220 is needed as described above, the case where an accessory, such as an air-conditioner or the like, is driven, the case where the temperature of the cooling coolant of the engine 120 is raised to a predetermined temperature, etc.

Furthermore, the HV-ECU 320 stops the engine 120 in order to improve the fuel economy, depending on the state of operation of the vehicle or the state of the vehicle traction battery 220. After that, the HV-ECU 320 restarts the engine 120 according to the state of operation of the vehicle or the state of the vehicle traction battery 220.

When the vehicle 40 as described above moves between a road surface of a low friction coefficient (e.g., an iced road surface) and a road surface of an ordinary friction coefficient (e.g., an asphalt road surface), the state of the drive wheels 160 sometimes changes between the slipping state and the gripped state.

Figure 2:
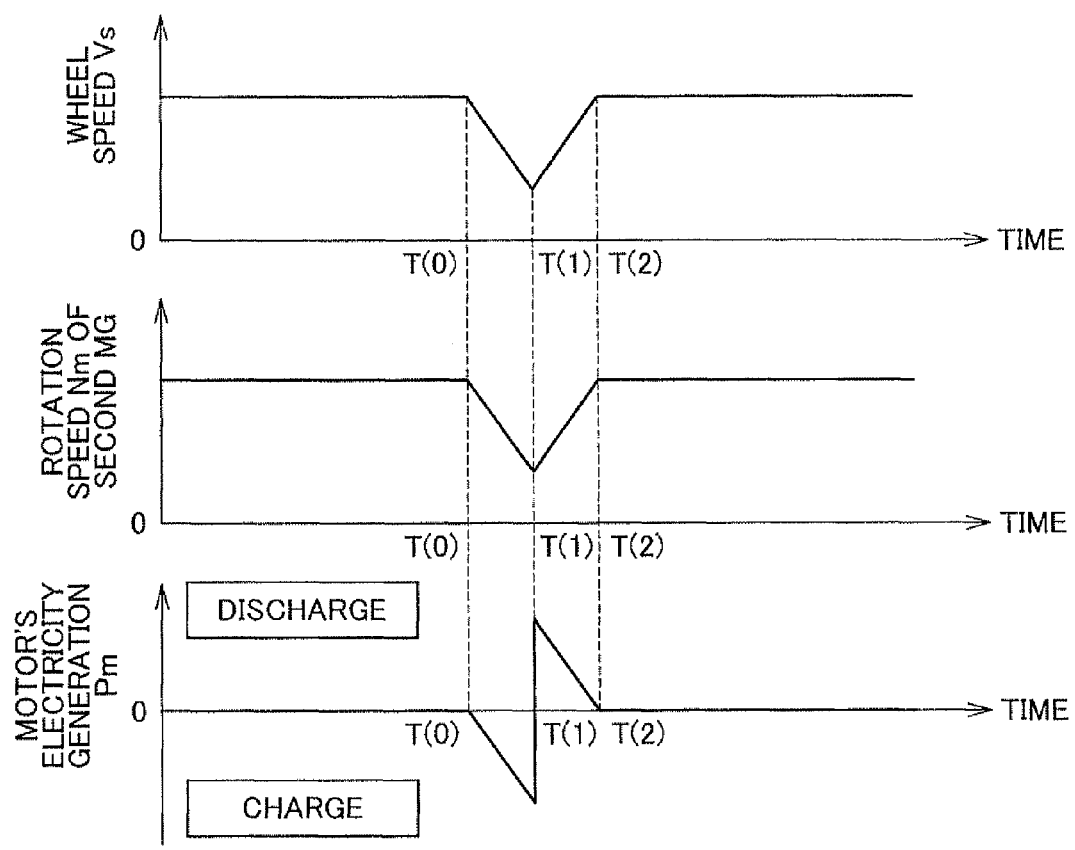
FIG. 2 is a timing chart showing changes in the generated electric power in the case where the state of drive wheels changes between a slipping state and a gripped state.

For example, FIG. 2 shows changes in the wheel speed Vs of the drive wheels 160, the rotation speed Nm of the second MG 142 and the amount of electric power generation Pm provided by the second MG 142, in a case where the vehicle 40 is considered to be traveling on a road surface of a low friction coefficient. When the vehicle 40 travels on a low-friction coefficient road surface, the drive wheels 160 enter the slipping state.

As shown in FIG. 2, in the case where the road surface on which the vehicle 40 is traveling changes from a road surface of a low friction coefficient to a road surface of an ordinary friction coefficient at time $T(0)$, the state of the drive wheels 160 changes from the slipping state to the gripped state on the road surface of the ordinary friction coefficient. Therefore, the reaction force produced from the road surface due to the change from the slipping state to the gripped state acts on the drive wheels 160 in the reverse rotation direction (i.e., due to increase in traction of the drive wheels 160), and thus the wheel speed decreases. At this time, the second MG 142 generates an electric power that corresponds to the product of the output torque of the second MG 142 multiplied by the amount of change in the rotation speed thereof. The electric power generated by the second MG 142 is supplied to the vehicle traction battery 220 via the inverter 240 and the converter 242, so that the vehicle traction battery 220 is charged. Specifically, the vehicle traction battery 220 absorbs the electric power generated by the second MG 142.

In FIG. 2, when at time $T(1)$, the road surface on which the vehicle 40 is traveling changes again from the ordinary-friction coefficient road surface to the low-friction coefficient road surface, the state of the drive wheels 160 changes from the gripped state to the slipping state on the low-friction coefficient road surface. Therefore, the wheel speed Vs sharply rises. Therefore, as for the second MG 142, the reaction force from the road surface acts in the same direction as the output torque (i.e., the reaction force from the road surface weakens), so that the rotation speed Nm rises. As a result, the vehicle traction battery 220 is discharged by the second MG 142.

At time $T(2)$, the state of the drive wheels 160 becomes a steady state in which there is no change between the slipping state and the gripped state. During this state, the second MG 142 neither generates electricity nor discharge the vehicle traction battery 220.

Thus, when the state of the drive wheels 160 changes from the slipping state to the gripped state, surplus electric power is sharply produced from the second MG 142, so that sometimes the generated surplus electric power cannot be sufficiently consumed in good response.

In this embodiment, the HV-ECU 320 executes a control for causing the electric power generated by the second MG 142 to be consumed by the EHC 124E if an execution condition that the state of the drive wheels 160 is changing between the slipping state and the gripped state is satisfied.

Furthermore, in the embodiment, the HV-ECU 320 estimates the generated electric power that is generated by the second MG 142 when the state of the drive wheels 160 changes from the slipping state to the gripped state. In the case where the estimated generated electric power exceeds a threshold value and in the case where the satisfaction of the foregoing execution condition, the HV-ECU 320 controls the EHC 124E so that electric power generated by the second MG 142 is consumed.

Furthermore, in the embodiment, the HV-ECU 320 controls the EHC 124E so that the electric power generated by the second MG 142 is consumed, if the temperature of the three-way catalytic converter 124B is lower than or equal to a predetermined value Ta and if the foregoing execution condition is satisfied.

Figure 3:
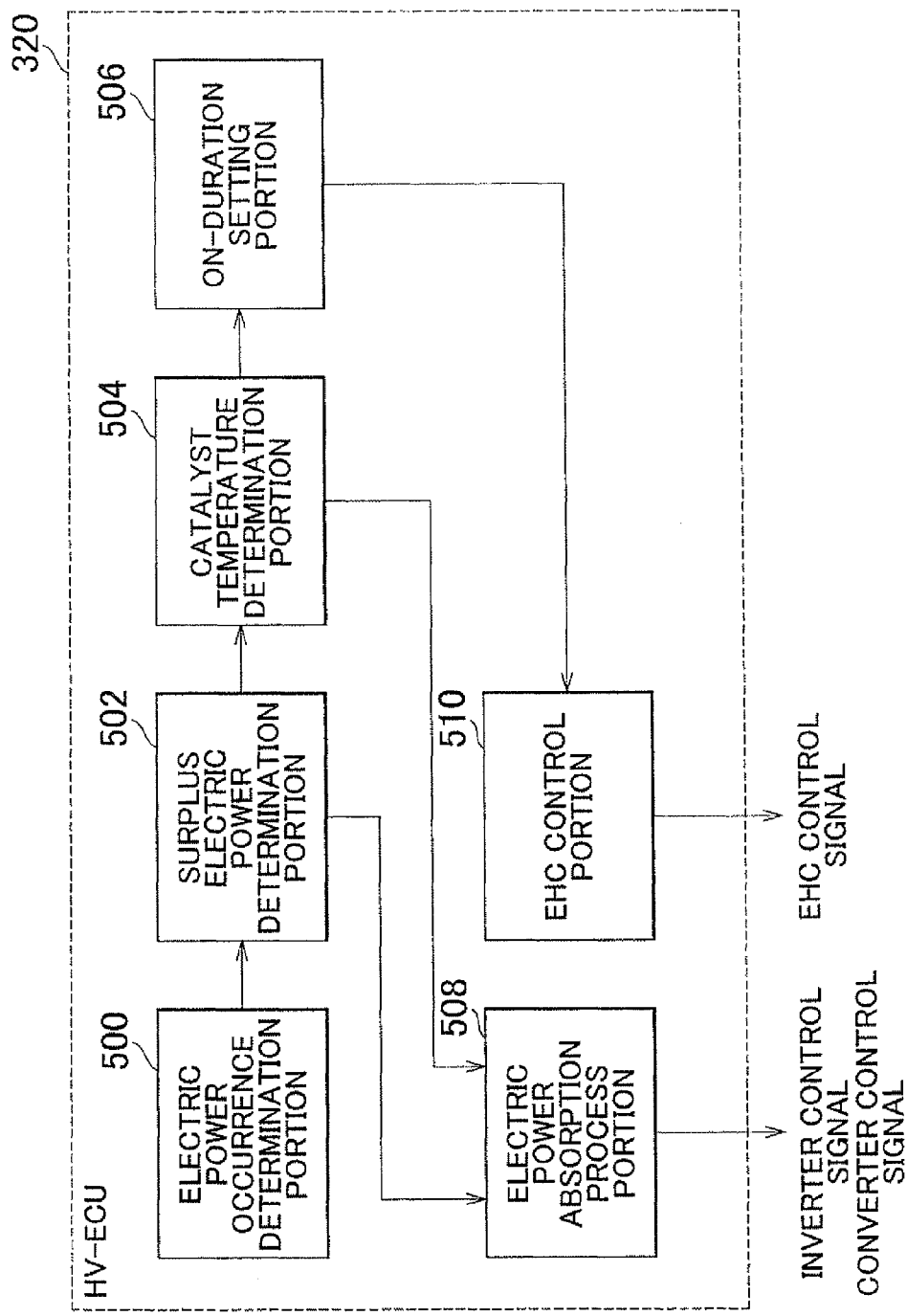
FIG. 3 is a functional block diagram of an HV-ECU that serves as a vehicle control apparatus in accordance with the embodiment of the invention.

FIG. 3 shows a functional block diagram of the HV-ECU 320, which is a vehicle control apparatus in accordance with this embodiment. The HV-ECU 320 includes an electric power occurrence determination portion 500, a surplus electric power determination portion 502, a catalyst temperature determination portion 504, an on-duration setting portion 506, an electric power absorption process portion 508, and an EHC control portion 510.

The electric power occurrence determination portion 500 determines whether or not the execution condition that the state of the drive wheels 160 is changing between the slipping state and the gripped state is satisfied. In this embodiment, the electric power occurrence determination portion 500 determines whether or not the state of the drive wheels 160 has changed from the slipping state to the gripped state, by determining whether or not the state of the vehicle 40 is a state in which surplus electric power is occurring or being produced.

Concretely, the electric power occurrence determination portion 500 determines that the vehicle 40 is in the state in which surplus electric power is occurring, if the product of a torque command value Tm for the second MG 142 multiplied by a time-dependent amount of change ΔN in the wheel speed, that is, the amount of power generation Pm, is smaller than zero. Besides, in the embodiment, negative values of the amount of power generation Pm correspond to a state in which electricity is being generated, and positive values of the amount of power generation Pm correspond to a state in which electricity is being discharged, or consumed. The electric power occurrence determination portion 500 may be constructed so as to turn on an electric power occurrence determination flag if it has determined that the state of the vehicle 40 is a state in which surplus electric power is being produced.

If the electric power occurrence determination portion 500 determines that the state of the vehicle 40 is a state in which surplus electric power is being produced, the surplus electric power determination portion 502 determines whether or not the surplus electric power is greater than a threshold value.

Incidentally, the threshold value may be a value that is determined beforehand on the basis of specifications of the vehicle traction battery 220, such as the kind and size of the vehicle traction battery 220, or the like, or may also be set on the basis of a state of the vehicle traction battery 220, such as the SOC, the temperature, etc. in addition to the specifications thereof. Alternatively, for example, in the case where surplus electric power is absorbed into the vehicle traction battery 220 via the inverter 240 or the converter 242, the threshold value may also be set by factoring in specifications or states of the inverter 240 and the converter 242 (e.g., the temperature thereof, the state of operation of switching elements, etc.) in addition to specifications or states of the vehicle traction battery 220.

The threshold value is, for example, a value of generated electric power that is produced in a short period when the state of the drive wheels 160 changes between the slipping state and the gripped state and that the vehicle traction battery 220 can receive without accelerating the degradation of the vehicle traction battery 220. The threshold value is adapted by experiments or by design.

Besides, the surplus electric power determination portion 502 may also be constructed so as to determine whether or not the surplus electric power exceeds (is greater than) the threshold value, for example, when the electric power occurrence determination flag is on, and to set an surplus electric power determination flag on if the surplus electric power is greater than the threshold value.

If the surplus electric power determination portion 502 determines that the surplus electric power is greater than the threshold value, the catalyst temperature determination portion 504 determines whether or not the temperature of the three-way catalytic converter 124B is lower than or equal to a predetermined value Ta. Incidentally, the predetermined value Ta is a temperature that allows it to be determined that the heating via the EHC 124E is necessary, and is set by design at, for example, 950° C. In addition, the catalyst temperature determination portion 504 may also determine whether or not the temperature of the three-way catalytic converter 124B is lower than or equal to the predetermined value Ta, for example, if the surplus electric power determination flag is on. Then, if it is determined that the temperature of the three-way catalytic converter 124B is lower than or equal to the predetermined value Ta, the catalyst temperature determination portion 504 may set the temperature determination flag on.

The on-duration setting portion 506 sets a duration during which the EHC 124E is kept on according to the surplus electric power, if the catalyst temperature determination portion 504 determines that the temperature of the three-way catalytic converter 124B is lower than or equal to the predetermined value Ta. The on-duration setting portion 506 sets the on-duration, for example, in such a manner that a first on-duration if the surplus electric power is a first value is shorter than a second on-duration if the surplus electric power is a second value that is greater than the first value. Incidentally, the on-duration may be a predetermined time, or may also be a period that elapses from when there is a surplus electric power and the surplus electric power is greater than the threshold value to when the surplus electric power is lower than or equal to the threshold value.

The electric power absorption process portion 508 executes a surplus electric power absorption process if the surplus electric power determination portion 502 determines that the surplus electric power is lower than or equal to the threshold value, or if the catalyst temperature determination portion 504 determines that the temperature of the three-way catalytic converter 124B is higher than the predetermined value Ta. Concretely, the electric power absorption process portion 508 executes the process of charging the vehicle traction battery 220 by supplying the surplus electric power produced by the second MG 142 to the vehicle traction battery 220 via the inverter 240 and the converter 242.

Incidentally, the electric power absorption process portion 508 may also execute the surplus electric power absorption process, for example, if the surplus electric power determination flag is off, or if the temperature determination flag is off.

When the on-duration setting portion 506 has set the on-duration, the EHC control portion 510 controls the relay 244 so that the EHC 124E is kept on until the set on-duration elapses. Concretely, the EHC control portion 510 sends an EHC control signal to the engine ECU 280, and thereby instructs the engine ECU 280 to control (actuate) the relay 244 so that the relay 244 is turned on.

In this embodiment, it has been described that each of the electric power occurrence determination portion 500, the surplus electric power determination portion 502, the catalyst temperature determination portion 504, the on-duration setting portion 506, the electric power absorption process portion 508 and the EHC control portion 510 functions as a software device that is realized by a CPU of the HV-ECU 320 executing a corresponding one of programs stored in a memory. However, each of those portions may also be realized by a hardware device. Incidentally, these programs are recorded on a storage medium, which is mounted in the vehicle.

Figure 4:
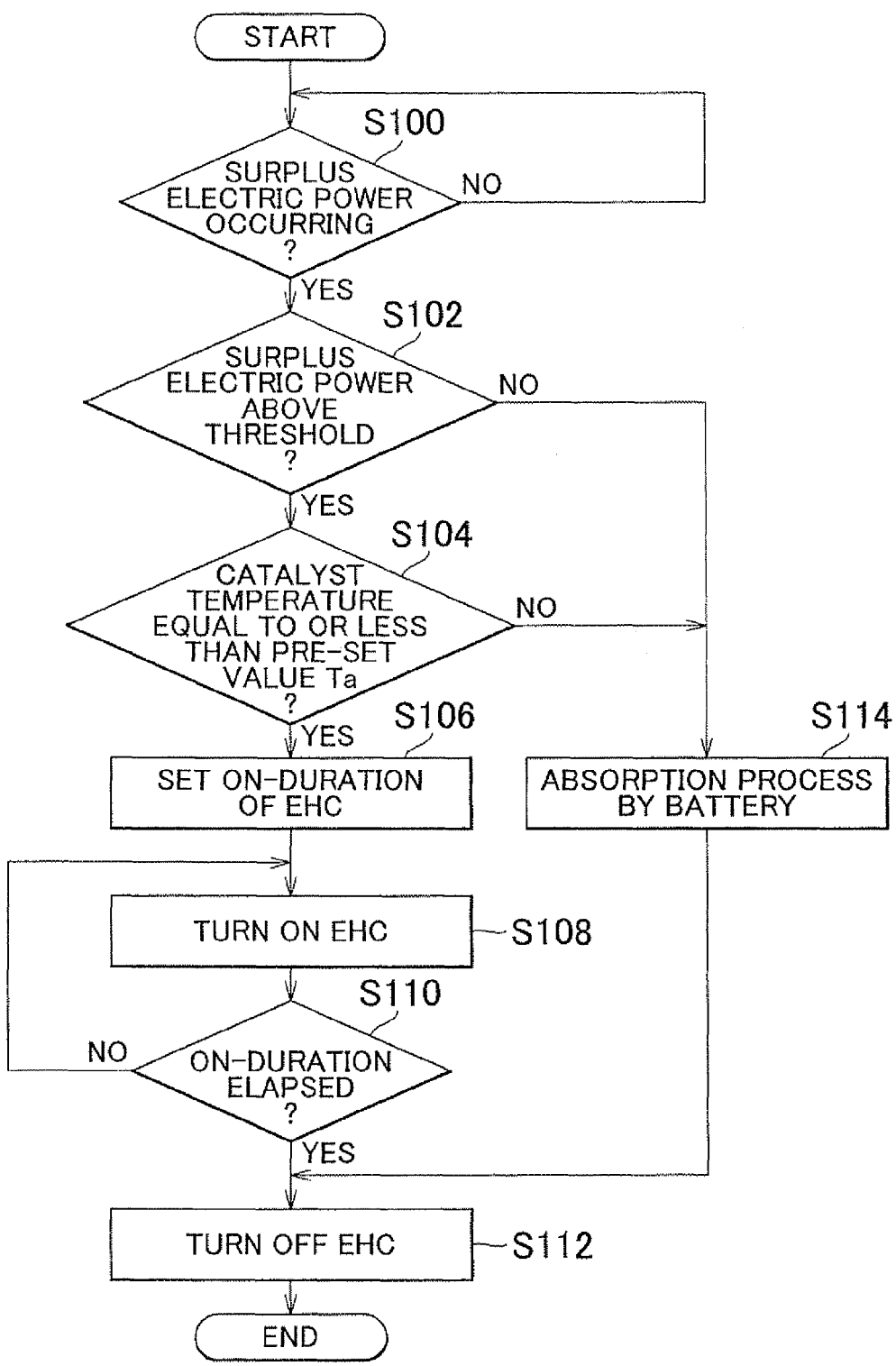
FIG. 4 is a flowchart showing a control structure for a program that is executed by the HV-ECU that is the vehicle control apparatus in accordance with the embodiment of the invention.

With reference to FIG. 4, a control structure of a program executed by the HV-ECU 320, which is a vehicle control apparatus in accordance with this embodiment, will be described.

In step (hereinafter, termed S) 100, the HV-ECU 320 determines whether or not surplus electric power is being produced. If a surplus electric power is being produced (YES in S100), the process proceeds to S102. If not (NO in S100), the process returns to S100.

In S102, the HV-ECU 320 determines whether or not the surplus electric power is greater than a threshold value. If the surplus electric power is greater than the threshold value (YES in S102), the process proceeds to S104. If not (NO in S102), the process proceeds to S114.

In S104, the HV-ECU 320 determines whether or not the temperature of the three-way catalytic converter 124B is lower than or equal to the predetermined value Ta. If the temperature of the three-way catalytic converter 124B is lower than or equal to the predetermined value Ta (YES in S104), the process proceeds to S106. If not (NO in S104), the process proceeds to S114.

In S106, the HV-ECU 320 sets an on-duration of the EHC 124E. The method of setting the on-duration is described above, and therefore will not be described in detail again.

In S108, the HV-ECU 320 instructs the engine ECU 280 to control (actuate) the relay 244 so that the EHC 124E turns on. In S110, the HV-ECU 320 determines whether or not the on-duration has elapsed. If the on-duration has elapsed (YES in S110), the process proceeds to S112. If not (NO in S110), the process returns to S108.

In S112, the HV-ECU 320 instructs the engine ECU 280 to control (actuate) the relay 244 so that the EHC 124E turns off. In S114, the HV-ECU 320 executes the surplus electric power absorption process. The surplus electric power absorption process is described above, and therefore will not be described in detail again.

An operation of the HV-ECU 320, which is the vehicle control apparatus in accordance with the embodiment based on the structure and the flowchart described above, will be described with reference to FIGS. 5 and 6.

For example, a case in which the vehicle 40 is traveling steadily on a low-friction coefficient road surface is assumed below. It is also assumed that at this time, the state of the drive wheels 160 is the slipping state.

Figure 5:
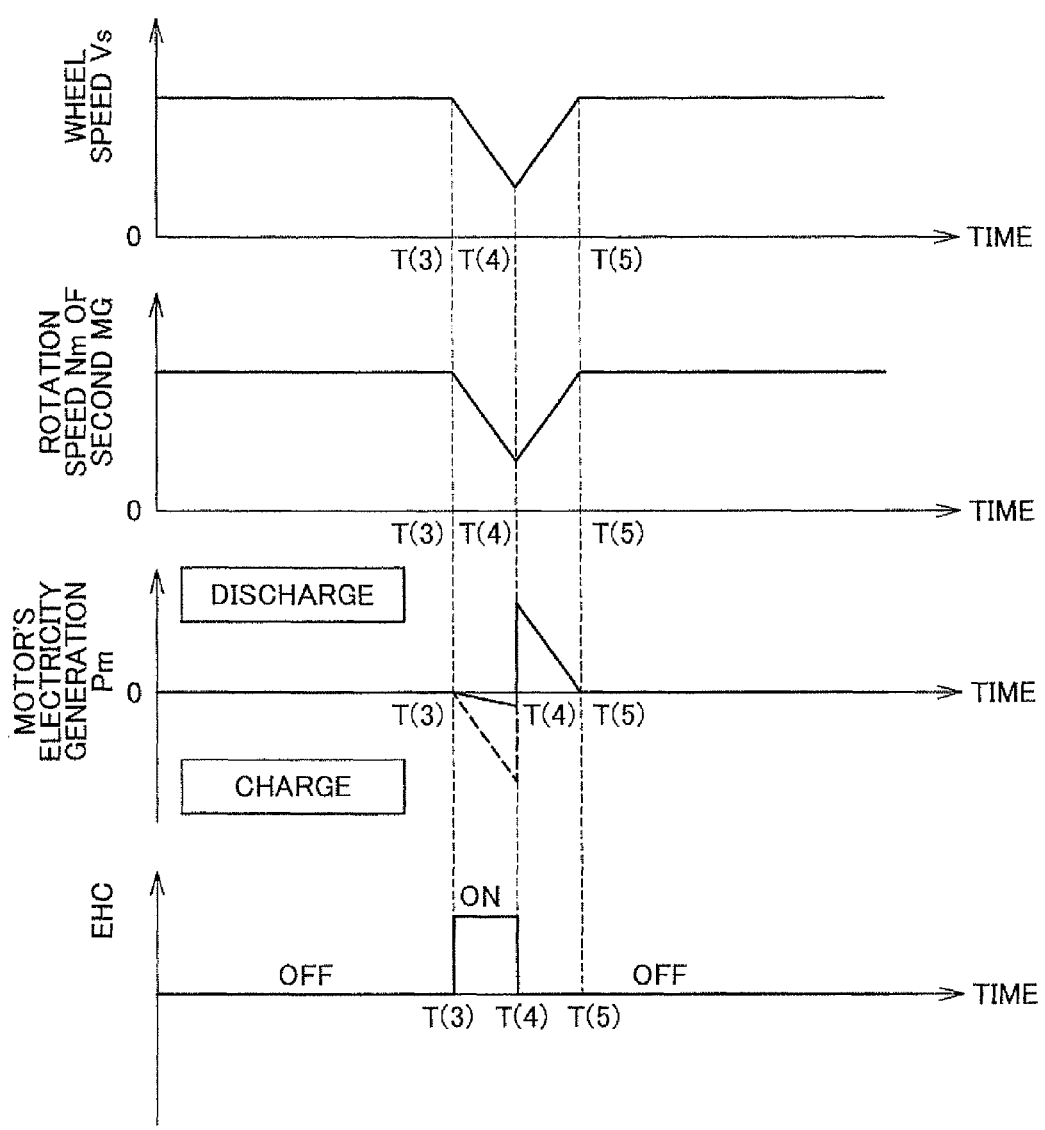
FIG. 5 is a timing chart (Sheet 1) showing an operation of the HV-ECU that is the vehicle control apparatus in accordance with the embodiment of the invention.

As shown in FIG. 5, if at time T(3), the road surface on which the vehicle 40 is traveling changes from a low-friction coefficient road surface to an ordinary-friction coefficient road surface, the state of the drive wheels 160 changes from the slipping state to the gripped state on the ordinary-friction coefficient road surface. Therefore, because the reaction force produced from the road surface due to the change from the slipping state to the gripped state sharply acts on the drive wheels 160 in the reverse rotation direction, the wheel speed Vs sharply decreases. As a result, the second MG 142 generates an electric power that corresponds to the product of the output torque multiplied by the amount of change in the rotation speed of the the second MG 142, as a surplus electric power (YES in S100).

In the case where the surplus electric power is greater than the threshold value (YES in S102) and where the three-way catalytic converter 124E is lower than or equal to the predetermined value (YES in S104), the on-duration of the EHC 124E is set on the basis of the surplus electric power (S106), and the EHC 124E is turned on (S108). Because the EHC 124E is turned on, an amount of surplus electric power calculated by subtracting an electric power that corresponds to a region bounded by solid lines in FIG. 5 from the surplus electric power generated by the second MG 142 (that corresponds to a region bounded by interrupted lines in FIG. 5) is consumed during the period from time T(3) and time T(4). In addition, due to the activation of the EHC 124E, the temperature of the three-way catalytic converter 124B rises.

When the set on-duration elapses at time T(4) (YES in S110), the EHC 124E is turned off (S112).

Besides, if the surplus electric power is lower than or equal to the threshold value (NO in S102), or if the temperature of the three-way catalytic converter 124B is higher than the predetermined value Ta (NO in S104), the EHC 124E is not turned on, but the surplus electric power absorption process is executed (S114).

In addition, as the road surface on which the vehicle 40 is traveling changes from the ordinary-friction coefficient road surface to a low-friction coefficient road surface at time T(4), the state of the drive wheels 160 changes from the gripped state to the slipping state on the low-friction coefficient road surface. Therefore, the reaction force that the road surface produces on the drive wheels 160 in the reverse rotation direction weakens due to the change from the gripped state to the slipping state, so that the wheel speed Vs increases. As a result, the second MG 142 consumes an electric power that corresponds to the product of the output torque of of the second MG 142 multiplied by the amount of change in the rotation speed of the second MG 142 (NO in S100).

As the wheel speed Vs returns to the value occurring prior to the change from the slipping state to the gripped state (prior to time T(3)) at time T(5), the wheel speed Vs and the rotation speed Nm of the second MG 142 enter a steady state, so that the second MG 142 performs neither electric power generation nor electric power consumption.

Besides, in FIG. 5, both the time at which the EHC 124E is turned off and the time at which the drive wheels 160 start to change from the gripped state to the slipping state again are the time T(4), the invention, is not particularly limited to a construction in which those two time points coincide with each other.

Next, for example, the case where the vehicle 40 is steadily traveling on an ordinary-friction coefficient road surface is assumed. It is assumed that the state of the drive wheels 160 at this time is the gripped state.

Figure 6:
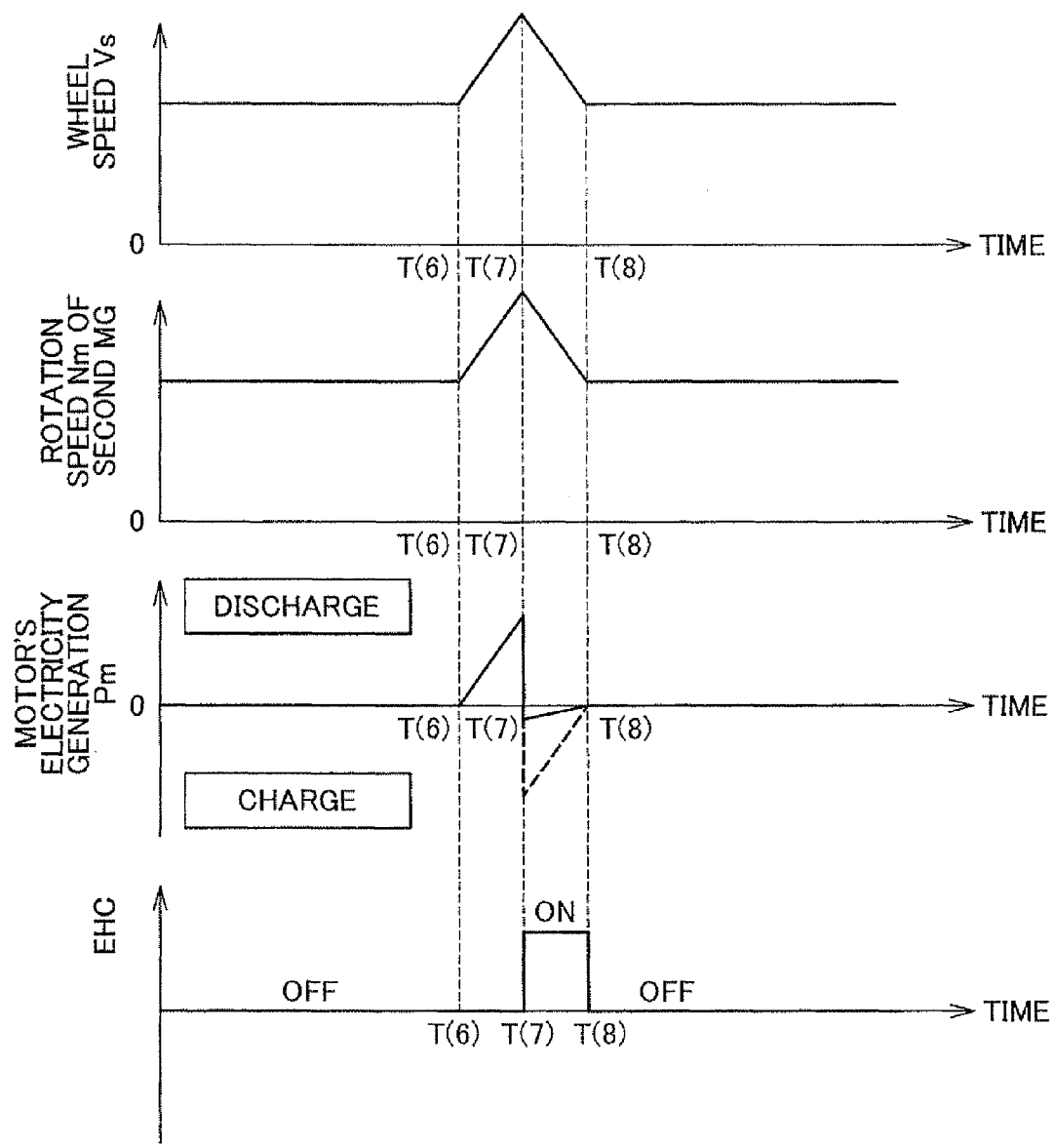
FIG. 6 is a timing chart (Sheet 2) showing an operation of the HV-ECU that is the vehicle control apparatus in accordance with the embodiment of the invention.

As shown in FIG. 6, as the road surface on which the vehicle 40 is traveling changes from an ordinary-friction coefficient road surface to a low-friction coefficient road surface at time T(6), the state of the drive wheels 160 changes from the gripped state to the slipping state on the low-friction coefficient road surface. Therefore, since the reaction force that the road surface produces on the drive wheels 160 in the reverse rotation direction weakens due to the change from the gripped state to the slipping state, the wheel speed Vs increases. As a result, the second MG 142 consumes an electric power that corresponds to the product of the output torque of the second MG 142 multiplied by the amount of change in the rotation speed thereof.

As the road surface on which the vehicle 40 is traveling changes from the low-friction coefficient road surface to an ordinary-friction coefficient road surface at time T(7), the state of the drive wheels 160 changes from the slipping state to the gripped state on the ordinary-friction coefficient road surface. Therefore, the reaction force from the road surface sharply acts on the drive wheels 160 in the reverse rotation direction due to the change from the slipping state to the gripped state, so that the wheel speed Vs sharply decreases. As a result, the second MG 142 produces a generated electric power that corresponds to the product of the output torque of the second MG 142 multiplied by the amount of change in the rotation speed thereof, as a surplus electric power (YES in S100).

In the case where the surplus electric power is greater than the threshold value (YES in S102) and where the temperature of the three-way catalytic converter 124B is lower than or equal to the predetermined value Ta (YES in S104), the on-duration of the EHC 124E is set on the basis of the surplus electric power (S106), and the EHC 124E is turned on (S108). Because the EHC 124E is turned on, an amount of surplus electric power calculated by subtracting an electric power that corresponds to a region bounded by solid lines in FIG. 6 from the surplus electric power generated by the second MG 142 (that corresponds to a region bounded by interrupted lines in FIG. 6) is consumed during the period from time T(7) and time T(8). Besides, due to the activation of the EHC 124E, the temperature of the three-way catalytic converter 124E rises.

Besides, if the surplus electric power is lower than or equal to the threshold value (NO in S102), or if the temperature of the three-way catalytic converter 124B is higher than the predetermined value Ta (NO in S104), the EHC 124E is not turned on, but the surplus electric power absorption process is executed (S114).

When the set on-duration elapses (YES in S110) at time T(8), the EHC 124E is turned off (S112).

Besides, as the wheel speed Vs returns, at time T(8), to the value occurring prior to the change from the gripped state to the slipping state (prior to time T(6)), the wheel speed Vs and the rotation speed Nm of the second MG 142 enter a steady state, so that the second MG 142 performs neither electric power generation nor electric power consumption.

Besides, in FIG. 6, both the time at which the EHC 124E is turned off and the time at which the drive wheels 160 returns from the slipping state to the gripped state are the time T(8), the invention is not particularly limited to a construction in which those two time points coincide with each other.

According to the vehicle control apparatus in accordance with this embodiment, when it is determined that the state of the drive wheels changes from the slipping state to the gripped state on the basis of the rotation speed, the surplus electric power can be consumed by the EHC by controlling the EHC so that the EHC consumes the electric power that is generated by the second MG. Therefore, it is possible to avoid the unnecessary charging of the vehicle traction battery and therefore avoid acceleration of degradation of the vehicle traction battery. Therefore, it is possible to provide a vehicle control apparatus and a vehicle control method that are able to efficiently consume the surplus electric power that is sharply produced by a vehicle-driving rotary electric machine when the state of drive wheels changes between the slipping state and the gripped state.

Besides, by supplying the EHC with electric power from the inverter, the surplus electric power generated by the second MG can be consumed without using a converter. Therefore, the component parts of the converter can be protected.

Furthermore, since there is no need to provide a discharge resistor for consuming the surplus electric power, the cost increase can be restrained.

Besides, in the foregoing embodiment, the EHC 124E is turned on if it is determined that a surplus electric power has been produced due to a change of the state of the drive wheels 160 from the slipping state to the gripped state. However, the EHC 124E may also be turned on at a timing of the switching from discharging to charging (at a timing of start of a change from the slipping state to the gripped state) in the case where it is determined that discharging has been performed due to the state of the drive wheels 160 changing from the gripped state to the slipping state in addition to or instead of the case where it is determined that a surplus electric power has been produced. The HV-ECU 320 may determine that discharging has been performed if the amount of power generation Pm of the second MG 142 is larger than zero. In addition, the HV-ECU 320 may also specifically determine the timing at which the amount of change in the wheel speed Vs changes from a positive value to a negative value as a timing of the switch from discharging to charging.

Furthermore, in the foregoing embodiment, in the case where the surplus electric power is greater than the threshold value and where the catalyst temperature is lower than or equal to the predetermined value Ta, the EHC 124E is turned on to consume electric power. The invention is not particularly limited to this construction. For example, the surplus electric power absorption process may also be executed by using the vehicle traction battery 220 as well as turning on the EHC 124E.

The embodiments and the like disclosed herein are illustrative in all respects, and are to be considered not restrictive in any respect. The scope of the invention is defined not by the foregoing description, but by the appended claims for patent, and is intended to cover all the changes and modifications within the meaning and scope equivalent to the claims for patent.

What is claimed is:

1. A vehicle control apparatus mounted in a vehicle that includes: an internal combustion engine; a vehicle-driving rotary electric machine that generates drive force on a drive wheel; and an electricity storage device that supplies electric power to the vehicle-driving rotary electric machine, wherein the internal combustion engine includes an exhaust passageway, a catalyst provided in the exhaust passageway, and a heater device that heats the catalyst by using electric power from the electricity storage device, the vehicle control apparatus comprising:
a determination portion that determines whether an execution condition that a state of the drive wheel is changing between a slipping state and a gripped state is satisfied, and
a control portion that executes a control for causing the electric power generated by the vehicle-driving rotary electric machine to be consumed by the heater device if the execution condition is satisfied.

2. The vehicle control apparatus according to claim 1, wherein
the execution condition is a condition that the state of the drive wheel is changing from the slipping state to the gripped state.

3. The vehicle control apparatus according to claim 1, further comprising
a rotational speed detection portion that detects rotational speed of the drive wheel,
wherein the determination portion determines whether the execution condition is satisfied, based on the rotational speed of the drive wheel.

4. The vehicle control apparatus according to claim 1, wherein:
the vehicle further includes a switching portion that switches from one to another of an electric power supply state in which the electric power is supplied from an electric power supply source to the heater device and an electric power cut-off state in which the electric power supplied from the electric power supply source to the heater device is cut off;
the vehicle control apparatus further includes an estimation portion that estimates generated electric power that is generated by the vehicle-driving rotary electric machine; and if the generated electric power estimated by the estimation portion is greater than a threshold value and if the execution condition is satisfied, the control portion switches state of the switching portion from the electric power cut-off state to the electric power supply state so that the electric power generated by the vehicle-driving rotary electric machine is consumed by the heater device.

5. The vehicle control apparatus according to claim 4, wherein if the execution condition is satisfied and the generated electric power estimated by the estimation portion is lower than or equal to the threshold value, the control portion charges the electricity storage device by using the electric power generated by the vehicle-driving rotary electric machine.

6. The vehicle control apparatus according to claim 1, wherein:

the vehicle further includes a switching portion that switches from one to another of an electric power supply state in which the electric power is supplied from an electric power supply source to the heater device and an electric power cut-off state in which the electric power supplied from the electric power supply source to the heater device is cut off;

the vehicle control apparatus further includes a temperature detection portion that detects temperature of the catalyst; and if the temperature of the catalyst detected by the temperature detection portion is lower than or equal to a predetermined temperature and if the execution condition is satisfied, the control portion switches state of the switching portion from the electric power cut-off state to the electric power supply state so that the electric power generated by the vehicle-driving rotary electric machine operating as the electric power supply source is consumed by the heater device.

7. The vehicle control apparatus according to claim 6, wherein if the execution condition is satisfied and the temperature of the catalyst detected by the temperature detection portion is higher than the predetermined temperature, the control portion charges the electricity storage device by using the electric power generated by the vehicle-driving rotary electric machine.

8. A vehicle control method for a vehicle that includes: an internal combustion engine; a vehicle-driving rotary electric machine that generates drive force on a drive wheel; and an electricity storage device that supplies electric power to the vehicle-driving rotary electric machine, wherein the internal combustion engine includes an exhaust passageway, a catalyst provided in the exhaust passageway, and a heater device that heats the catalyst by using electric power from the electricity storage device, the vehicle control method comprising:

determining whether an execution condition that a state of the drive wheel is changing between a slipping state and a gripped state is satisfied; and executing a control for causing the electric power generated by the vehicle-driving rotary electric machine to be consumed by the heater device if the execution condition is satisfied.

9. The vehicle control method according to claim 8, wherein the execution condition is a condition that the state of the drive wheel is changing from the slipping state to the gripped state.

10. The vehicle control method according to claim 8, further comprising detecting rotational speed of the drive wheel, wherein whether the execution condition is satisfied is determined based on the rotational speed of the drive wheel.

* * * * *